United States Patent
Tice

(10) Patent No.: US 6,927,688 B2
(45) Date of Patent: Aug. 9, 2005

(54) METHOD FOR ENABLING COMMUNICATION AND CONDITION MONITORING FROM INSIDE OF A SEALED SHIPPING CONTAINER USING IMPULSE RADIO WIRELESS TECHNIQUES

(75) Inventor: Russell N. Tice, Culpeper, VA (US)

(73) Assignee: CACI International Inc., Arlington, VA (US)

( * ) Notice: Subject to any disclaimer, the term of this patent is extended or adjusted under 35 U.S.C. 154(b) by 0 days.

(21) Appl. No.: 10/438,879

(22) Filed: May 16, 2003

(65) Prior Publication Data

US 2004/0196152 A1 Oct. 7, 2004

Related U.S. Application Data

(60) Provisional application No. 60/459,257, filed on Apr. 2, 2003.

(51) Int. Cl.[7] .................................................. G08B 1/08
(52) U.S. Cl. .............................. 340/539.26; 340/539.1; 340/545.6; 340/568.7; 340/585
(58) Field of Search ......................... 340/539.26, 539.1, 340/539.17, 545.6, 568.7, 585, 613

(56) References Cited

U.S. PATENT DOCUMENTS

| 4,750,197 A | * | 6/1988 | Denekamp et al. ....... 455/404.2 |
|---|---|---|---|
| 5,565,858 A | | 10/1996 | Guthrie .................... 340/10.33 |
| 5,804,810 A | | 9/1998 | Woolley et al. ............. 235/492 |
| 5,901,172 A | | 5/1999 | Fontana et al. ............. 375/130 |
| 5,917,433 A | * | 6/1999 | Keillor et al. ............... 340/989 |
| 5,959,568 A | | 9/1999 | Woolley ....................... 342/42 |
| 6,026,125 A | | 2/2000 | Larrick, Jr. et al. ......... 375/295 |
| 6,239,741 B1 | | 5/2001 | Fontana et al. ............. 342/135 |
| 6,351,652 B1 | | 2/2002 | Finn et al. ................. 455/552.1 |
| 6,492,904 B2 | | 12/2002 | Richards .................. 340/539.1 |
| 6,501,393 B1 | | 12/2002 | Richards et al. ............ 340/993 |
| 6,512,455 B2 | | 1/2003 | Finn et al. ................ 340/572.1 |
| 6,670,909 B2 | * | 12/2003 | Kim ............................. 342/50 |
| 2002/0000916 A1 | | 1/2002 | Richards .................. 340/572.1 |
| 2002/0014955 A1 | | 2/2002 | Klitsgaard ............... 340/10.42 |
| 2002/0168003 A1 | | 11/2002 | Richards ..................... 375/239 |
| 2003/0028286 A1 | | 2/2003 | Glenn et al. ................ 700/259 |

FOREIGN PATENT DOCUMENTS

WO   WO 03/023439   3/2003

OTHER PUBLICATIONS

Radio Solutions 2001, "Advances in UltraWide Band Technology", Nov. 6/7, 2001, KS:1—KS:39.
The IEEE Semiannual Vehicular Technology Conference VTC2001, Ultra–Wide Band Radio: Introducing A New Technology, Kazimierz SIWIAK, Spring, May 6–9, 2001, pp. 1–7.
Antenna Systems & Technology, Jan./Feb. 2001, vol. 4, Issue 1, "Ultra Wideband Technology Gains A Boost from New Antennas", Hans Gregory Schantz, Ph.D., pp. 1–3.
"Ultra–Wideband: Wireless Without Compromise—A Renaissance In The Making", prepared by XtremeSpectrum, pp. 1–7.

(Continued)

Primary Examiner—Donnie L. Crosland
(74) Attorney, Agent, or Firm—Nixon & Vanderhye P.C.

(57) ABSTRACT

A system to capture data regarding conditions in a sealed metal shipping container having: a sensor unit mountable inside the container and adapted to sense a condition inside of the container; an impulse radio transmitter receiving data from the sensor regarding the condition and transmitting an impulse radio wireless signal inside of the container; an impulse radio receiver external to the container and proximate the container, wherein the receiver is adapted to receive the impulse radio wireless signal propagating through the sealed metal shipping container, and a data device in communication with the receiver to capture the data from the sensor unit regarding the condition inside of the container.

17 Claims, 2 Drawing Sheets

OTHER PUBLICATIONS

Technical Report Naval Total Asset Visibility (NTAV) Tests on the S Curtiss, Port Hueneme, CA Sep. 25—Oct. 6, 2000, Appendix A "USC UltRa Lab: Shipboard Environment Characterization", Mar. 2002, Naval Facilities Engineering Service Center, Steven J. Gunderson et al., pp. A–2 through A–15.

Time Domain®, "PulsON® Technology Overview", Copyright Jul. 2001, pp. 1–13.

"Measurement of UWB Antenna Efficiency", Hans Gregory Schantz et al., pp. 1–3.

"Generating Near–White Ultra–Wideband Signals With Period Extended PN Sequences", Xiaojing Huang and Yunxin Li, pp. 1–5.

"Impact of Ultra Wide Band Transmissions of a Generic Receiver", Kazimierz SIWIAK, pp. 1–3.

"The Effects of Multipath Interference On The Performance of UWB Systems In An Indoor Wireless Channel", Jeffrey R. Foerster, pp. 1–5.

"A Statistical Model For The UWB Indoor Channel", Dajana Cassioli et al., pp. 1–8.

"Ultra–Wide Band Radio: The Emergence Of An Important New Technology", Kazimierz SIWIAK, pp. 1–4.

FC News, Federal Communications Commission, "FCC To Host Technology Demonstration Of New Ultra–Wideband Devices With Applications For Public Safety, Businesses, and Consumers", Feb. 11, 2003, pp. 1–2.

"XtremeSpectrum Issued Fundamental Patent For Ultra–Wideband, Formally Establishes Industry's Premier Patent Portfolio", Copyright 2003 XtremeSpectrum, Inc., pp. 1–2.

"Mono–Phase and Bi–Phase Ultra–Wideband White Paper", Prepared by XtremeSpectrum May 2002, pp. 1–4.

Techtrends, Ultrawideband: The Next Wireless Panacea, Nicholas Cravotta, Oct. 17, 2002, pp. 51–58.

"7 Impulse Radio", Robert A. Scholtz and Moe Z. Win, pp. 245–267.

IEEE Communications Letters, vol. 2, No. 1, Jan. 1998, "Impulse Radio: How It Works", Moe Z. Win et al. , pp. 1–3.

International Search Report dated Feb. 2, 2005.

\* cited by examiner

METHOD FOR ENABLING COMMUNICATION AND CONDITION MONITORING FROM INSIDE OF A SEALED SHIPPING CONTAINER USING IMPULSE RADIO WIRELESS TECHNIQUES

RELATED APPLICATION

This application is related to and claims priority to a provisional application Ser. No. 60/459,257 entitled "METHOD FOR ENABLING COMMUNICATION AND CONDITION MONITORING FROM INSIDE OF A SEALED SHIPPING CONTAINER USING IMPULSE RADIO WIRELESS TECHNIQUES", filed Apr. 2, 2003, and identifying Russell N. Tice as the inventor. The entirety of this provisional application is hereby incorporated by reference.

FIELD OF THE INVENTION

The present invention relates in general to sensors and remote monitoring system. The invention relates, in particular, to a network, sensor and method that uses impulse radio technology to monitor and display information about cargo in a sealed steel freight container.

BACKGROUND OF THE INVENTION

There is a need to provide wireless communications from inside a sealed steel freight container to an external receiver and an information processing device. ISO steel freight containers are commonly used to ship cargo via ships, trains and trucks. The typical dimensions of these containers are 20 feet long; 8 feet long, and 8 feet, six inches tall. These containers may be loaded with cargo and sealed shut in a foreign country. Several million cargo containers—about 95 percent of U.S. international trade—enter the United States every year through its 361 sea and river ports. Since Sep. 11, 2001, there has been a pronounced concern that terrorists might use the containers to sneak biological weapons or other arms into the country. This method allows government, port or shipping company officials to monitor a container's location—and determine whether it has been tampered with.

The shipment of sealed ISO containers raises security risks and concerns about the safety and integrity of the cargo during shipment. The large number of ISO containers that are shipped worldwide cannot all be readily opened and inspected at each port, rail yard and trucking depot. It is virtually impossible for security personnel to inspect the contents of all ISO containers in transit to ensure that the containers are not being used to smuggle dangerous or illegal products, and have not been opened and tampered with during transportation. A cleaver thief, smuggler or terrorist may gain access to an ISO shipping container in transit and open the container to steal goods from the container, or insert into the container illegal products, e.g., drugs, or a bomb. By closing and resealing the container, the thief, smuggler or terrorist may avoid detection and the tainted container may continue its journey to its intended final destination. Even if the container is not intentionally opened during shipment, the inside of the container may subjected to environmental conditions, e.g., heat and humidity, that can damage the cargo in the container. In view of these dangers and the difficulty with inspecting ISO containers in transit, there is an urgent requirement for techniques and systems to inspect ISO shipping containers that are automated and do not require the container to be opened.

Obtaining data about the cargo inside of a sealed ISO shipping container is problematic. The container is formed of steel which effectively blocks wireless electromagnetic signals. Wireless signals may be further blocked by contents and adjacent containers, especially while the containers are stacked on top of each other. The doors of the container have seals that block water and wind, but also block optical signals from emanating from the container. Accordingly, passing a signal trough the container without breaching the wall of the container is difficult.

Prior attempts to track ISO containers have generally involved placing labels or transmitters on the outside of the containers. These external labels and transmitters may be dislodged in transit, may become damaged by weather or collisions with other containers, and do not interrogate the cargo inside of the container.

To transmit an external signal from inside a sealed ISO container, a transmitter inside of the container has been directly connected to antenna that protrudes through the wall of the container. See, e.g., U.S. Pat. No. 6,492,904 at col. 15 and FIG. 11. Projecting an antenna through the container wall breaches the container and may not be acceptable for ISO compliant shipping containers. Accordingly, there is a long felt need for an non-obtrusive technique and system that monitors and collects data regarding the interior of ISO shipping containers and their cargo, and automatically conveys that data to an external data collection receiver without breaching the sealed container.

BRIEF DESCRIPTION OF THE INVENTION

In one embodiment, the present invention provides a means for wirelessly communicating from inside a sealed steel freight container to an information processing device outside of the container via impulse radio wireless communications. The system overcomes the difficulty in transmitting through a sealed metal container by using a short range wireless transmission from inside of the container that propagates through seals, air vents and other gaps in the metal of the container. This method provides for automation of monitoring the cargo in a metal container and provides enhanced security measures, container condition monitoring and cargo tracking.

In a first embodiment, the invention is a system to capture data regarding conditions in a sealed metal shipping container comprising: a sensor unit mountable inside the container and adapted to sense a condition inside of the container; an impulse radio transmitter receiving data from the sensor regarding the condition and transmitting an impulse radio wireless signal inside of the container; an impulse radio receiver external to the container and proximate the container, wherein said receiver is adapted to receive the impulse radio wireless signal propagating through the sealed metal shipping container, and a data device in communication with the receiver to capture the data from the sensor unit regarding the condition inside of the container.

In another embodiment, the invention is a method to capture data regarding at least one condition in a sealed metal shipping container comprising: mounting an wireless transmitter inside of the container; mounting a sensor inside of the container to monitor the at least one condition and establishing a communication link between the transmitter and the sensor wherein the transmitter receives data from the sensor regarding the condition; sealing shut the container; transmitting an wireless signal carrying the data regarding the condition from the transmitter wherein the signal emanate from inside of sealed container, passes through walls of the container and propagates outside of the container; receiving the transmitted wireless signal by a receiver located externally of the container and proximate the container; and capturing the data from the wireless signal in a data device in communication with the receiver to store capture the data from the sensor unit regarding the at least one condition.

DETAILED DESCRIPTION OF THE INVENTION

Figure 1:
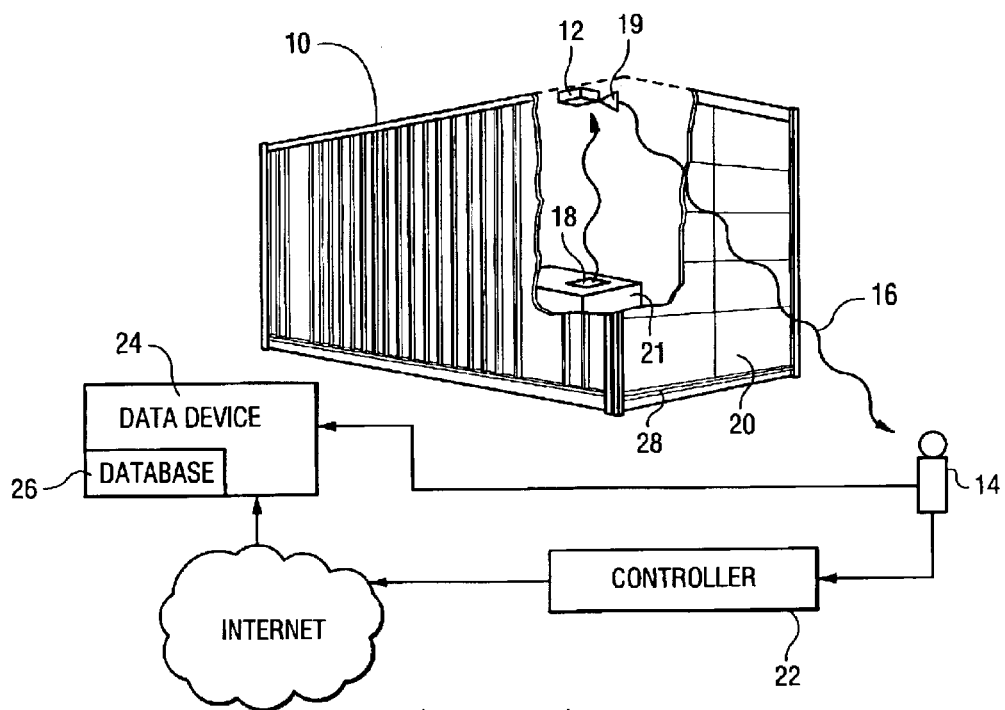
FIG. 1 is a perspective view of an exemplary ISO shipping container, shown in a partially cut away view, having a transmitter communicating with an external receiver and database.

FIG. 1 is an illustration of a sealed metal shipping container 10 having an internal ultra wide-band (UWB) transmitting tag 12, e.g., a C-Band tag, and an external receiver 14, e.g., the C-Band receiver, that receives a wireless signal 16 transmitted by the UWB tag 12 from inside the container 10. The transmitter 12 may be an ultra wideband (UWB) pulse radio transmitter in data communication with sensor(s) 18 (see FIG. 3) inside a sealed container 10. These sensors monitor the container cargo and the internal environment of the container. The transmitter tag 12 collects data from the internal sensors 18 and transmit the data through the sealed container to the receiver 14. These sensors may be transmitting tags that identify cargo 21 to which they are attached. The transmitter tag may include a antenna having a standard corner reflector 19 that broadcasts a signal within the container 10.

A UWB receiver 14 outside of the container 10 pickups the signal 16 from the inside UWB transmitter 12. The receiver 14 is proximate the container. For example, the receiver may be positioned in front of the container and within 20 feet of the container doors 20. Similarly, the transmitter 12 may be located on an inside wall of the container near the front doors 20 of the container. Positioning the receiver proximate the container, especially near the seals 28 on the container doors 20, allows the receiver to pickup the weak signal that leaks through the container from the internal transmitter tag.

The receiver 14 may be portable and hand carried about container. Carrying the receiver in the proximity of the container may increase the likelihood that the signal from the interior of the container will be captured at some point as the receiver traverses the beam pattern of the transmitter. A portable receiver 14 may also be used to capture data from many different containers in, for example, a shipping yard.

The signal 16 is emitted by the internal transmitting tag 12 from inside of the sealed container 10. The transmitted signal 16 leaks through the non-conductive seals 28 on the front doors 20 of the container 10, air vents in the container, and other gaps in the metal container. The signal 16 is attenuated as in passes through the walls of the container. The metal walls of the container block much of the signal transmitted from the internal transmitter. The external receiver 14 must sense the attenuated signal 16 that leaks through the metal container 10. Further, the receiver must capture data that is carried by the signal 16.

The external receiver 14 may connect to a data device having a database 26 or the receiver may connect to a network controller 22 that provides a remote link to the data device 16. The data device may store the received data in the database 26. The data device 24 may be a hand held electronic device, personal digital assistant (PDA) or a notebook computer. The data device collects the data received from the tag transmitter 12 regarding the internal conditions of the sealed container and its cargo. The network controller 22 alternatively may transmit the received data via the Internet to a specific Internet IP address for a remote data device 24 so that the database 26 may be accessed via the Internet.

The container walls effectively prevent the transmission of data from outside of the container into the transmitting tag 12 in the container. Data and commands from outside of the container are not wirelessly transmitted into the container. The transmitting tag does not receive information or commands from outside of the container, such as when to transmit a signal or whether the container is in transit or at a dock or loading yard. Accordingly, the internal transmitting tag operates without information or commands from outside of the container.

The tag 12 is programmed to periodically transmit data regarding the interior of the container and cargo data. The tag may transmit a signal continuously or every second, for example. Moreover, the tag may be programmed to transmit periodically, only if certain events occur. The events may be rapid change of the temperature or humidity in the container, which would indicate the door to the container being opened. The UWB transmitter tag 12 is powered by a battery in the container. The battery is selected to have sufficient capacity to power the tag 12 for some predetermined period of time, e.g., five years.

Figure 2:
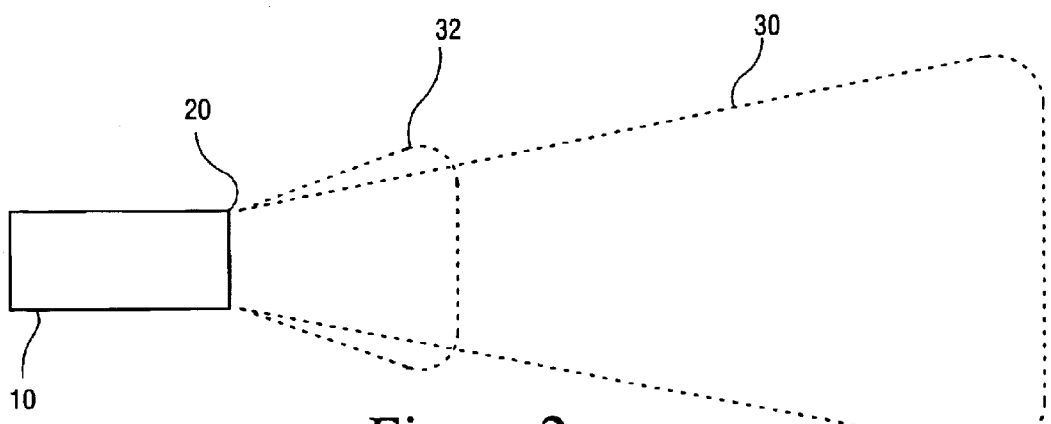
FIG. 2 is a top view of an ISO container and signal beam patterns from internal transmitters.

FIG. 2 is an illustration of an analysis of transmitted signal beam patterns emitted from an internal UWB transmitter tag 12 through a sealed container. The transmission pattern extends outward of the container from the front doors 30 of the container 10. The outside of the container transmission pattern 30 for a L-Band UWB transmitter may extend one-hundred and eight six feet beyond the container 10. The transmission pattern 32 for a C-Band UWB transmitter may extend only twenty feet from the container.

An exemplary L-Band UWB transmitter tag has a peak power transmission value of approximately 250 milliwatts. An exemplary C-Band UWB transmitter has a peak of –25 milliwatts (where 10 times power corresponds to 10 dB). The L-Band UWB transmitter tag has an antenna gain of approximately 8 dBi (decibels isotopic), whereas the C-Band UWB transmitter has a gain of –0 dBi. This difference in gain is due to the directional nature of the beam pattern from the L-Band transmitter and the omni-directional beam pattern from the C-Band transmitter. Both L and C-Band receivers have similar antenna gains (8 dBi) when used with a standard corner reflector 19.

An L-band transmitter tag transmitted, during an experiment, through a sealed container and gave consistent reception and data acquisition 20 feet from the containers and up to 186 feet in front of a container 10. A C-band transmitter tag transmitted through a container and its signal 16 was received no data packet loss at 45 feet from the corner air vents in a 20 degree emission and up to 20 feet in front of the container. However, these air vents maybe be blocked when containers are stacked together. The air vents are not a reliable point of signal opportunity. While the L-Band transmitter tag has a longer transmission range, it consumes substantially more battery power than does the C-Band transmitter tag. In applications where extended battery life is a stronger concern than transmission range, the C-Band transmitter tag may be preferable to the L-Band transmitter tag. In addition, receivers that sense timing sequences in the signals transmitted by the tag transmitter have demonstrated better performance than do receivers that detect the shape of the signal transmitted by the tag receiver. It is suspected that the shape of the signal generated by the transmitter tag becomes distorted as the signal leaks through the container and, thus, receivers that rely on detecting signal shape have difficulty in recognizing the distorted signal from tags in metal containers. On the other hand, it is suspected that the timing sequences in a transmitted signal do not become distorted as the signal passes through a container. Thus, receivers that detect signal timing sequences appear to be better suited for receiving signals passing through a metal container.

Given the typical stacking configuration of the shipping containers on a container ship, shipping port and at shipping depots, it is anticipated that the strongest transmitter tag beam 16 emanating from the containers will be at the front doors 20 of each container. Accordingly, the receivers 14 may be best positioned in front of the containers to receive the signals 16 from the internal transmitter tags 12.

Figure 3:
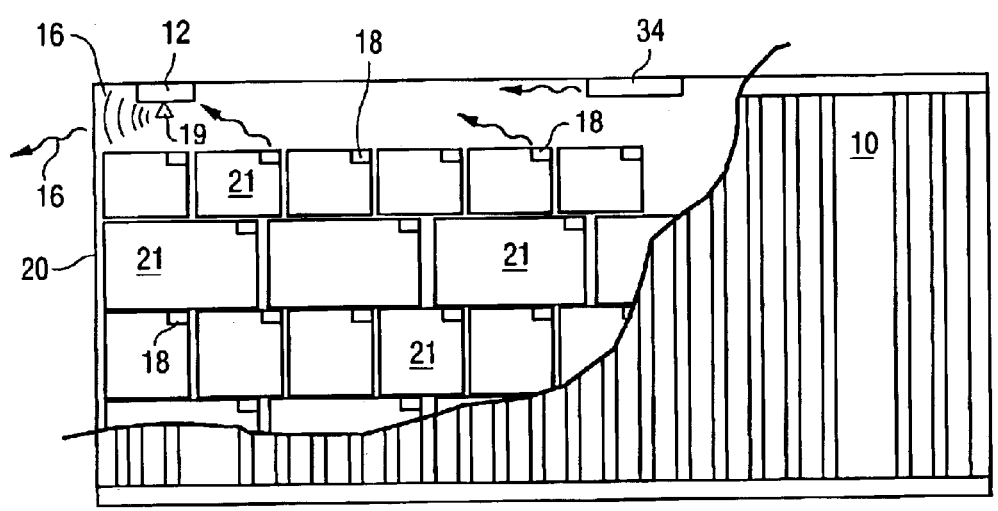
FIG. 3 is a perspective view of a shipping container with a cut-away view to show the cargo and transmitter inside of the container.

FIG. 3 is a partially cutaway view of conventional ISO metal shipping container 10, e.g., cargo container. The shipping container is generally sealed at a departure location and unsealed at its destination. An internal transmitter tag 12 positioned near the doors 20 monitors the contents 21 of a container between its departure and destination locations. The transmitting tag 12 may detect, for example, whether the sealed container has been opened in transit. The monitoring of the contents of the cargo container is accomplished without breaching the seal of the container. The transmitting tag 12 may receive wireless signals from transmitting data cargo tags 18 on the cargo contents in the container. The cargo tags may include information about the cargo to which the tag is attached.

Further, the transmitting tag 12 may be connected to receive data from internal humidity, temperature and light sensors 34. The transmitted data from the internal transmitter 12 may include information such as the environmental condition (current and historical) in the container, e.g., temperature, humidity and light levels, and the cargo contents in the container. The data may be loaded into a data file of the database 26 of information regarding the container and its cargo.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system to capture data regarding conditions in a sealed metal shipping container comprising:
    a sensor unit mountable inside the container and adapted to sense a condition inside of the container;
    an impulse radio transmitter receiving data from the sensor regarding the condition and transmitting an impulse radio wireless signal inside of the container, wherein said transmitter comprises an antenna mounted internally within the container;
    an impulse radio receiver external to the container and proximate the container, wherein said receiver is adapted to receive the impulse radio wireless signal from the antenna and said signal propagates through the sealed metal shipping container, and
    a data device in communication with the receiver to receive said signal and capture the data from the sensor unit regarding the condition inside of the container.

2. The system as in claim 1, wherein said radio transmitter is powered by a battery in the container.

3. The system as in claim 1, wherein the receiver and the transmitter are ultra wideband impulse radio devices.

4. The system as in claim 1, wherein the transmitter is mounted proximate a front door of the container.

5. The system as in claim 1, wherein the transmitter is adapted to transmit at predefined intervals.

6. The system as in claim 1, wherein the sensor monitors a tracked object in the container and the sensor transmits the data regarding the condition of the tracked object, wherein said data further comprises identification information regarding the tracked object.

7. The system as in claim 1, wherein the sensor senses an environmental condition of the sealed container and the data comprises information regarding the environmental condition sensed by the sensor.

8. The system as in claim 7, further comprising a database tracking the received data from the sensor monitor the environmental condition within sealed container, wherein said container is a steel fright container.

9. The system as in claim 1 wherein the impulse radio receiver senses a timing sequence impulse radio wireless signal.

10. A method to capture data regarding at least one condition in a sealed metal shipping container comprising:
    mounting an wireless transmitter inside of the container;
    mounting a sensor inside of the container to monitor the at least one condition and establishing a communication link within the container between the transmitter and the sensor wherein the transmitter receives data from the sensor regarding the condition;
    sealing shut the container;
    transmitting an wireless signal carrying the data regarding the condition from the transmitter wherein the signal emanates from an antenna entirely inside of the sealed shut container, and propagates outside of the container;
    receiving the transmitted wireless signal by a receiver located externally of the container and proximate the container; and
    capturing the data from the wireless signal in a data device in communication with the receiver to store the captured data regarding the condition.

11. The method as in claim 10 wherein the transmitter is an impulse radio transmitter and the receiver is an impulse radio receiver.

12. The method as in claim 10 wherein the transmitter is an ultra wideband (UWB) impulse radio transmitter and the receiver is an UWB impulse radio receiver.

13. The method as in claim 10 wherein the transmitter is mounted proximate a front door of the container.

14. The method as in claim 10 wherein the wireless signal leaks out through door seals on the container and the receiver is positioned in front of closed doors of the container.

15. The method as in claim 10 wherein the at least one condition is at least one of container internal humidity, temperate and light level.

16. The method as in claim 10 wherein the at least one condition is contents of cargo in the container.

17. The method as in claim 10 wherein the receiver receives the transmitted wireless signal and recognizes a timing sequence in the signal to detect the signal.

* * * * *